(12) United States Patent
Gillard et al.

(10) Patent No.: US 8,911,006 B2
(45) Date of Patent: Dec. 16, 2014

(54) MOTOR VEHICLE FRONT-END ASSEMBLY COMPRISING MEANS FOR LOCKING A FRONT-END MODULE ONTO A RAILPLATE

(71) Applicant: Faurecia Bloc Avant, Nanterre (FR)

(72) Inventors: Laurent Gillard, Southfield, MA (US); Anthony Hughes, Chesterfield, MI (US)

(73) Assignee: Faurecia Bloc Avant, Nanterre (FR)

( * ) Notice: Subject to any disclaimer, the term of this patent is extended or adjusted under 35 U.S.C. 154(b) by 0 days.

(21) Appl. No.: 13/856,943

(22) Filed: Apr. 4, 2013

(65) Prior Publication Data

US 2013/0264841 A1 Oct. 10, 2013

(30) Foreign Application Priority Data

Apr. 6, 2012 (EP) ................................. 12305413

(51) Int. Cl.
B62D 25/08 (2006.01)

(52) U.S. Cl.
CPC .............. *B62D 25/08* (2013.01); *B62D 25/085* (2013.01)
USPC ................................ 296/193.09; 296/203.02

(58) Field of Classification Search
CPC .... B62D 25/08; B62D 25/163; B62D 25/085; B62D 21/152; B62D 21/12; B60D 1/485; B60D 1/488; B60J 5/045; B60J 5/0452; B60J 5/0497
USPC ........................ 296/193.09, 203.02; 180/68.4
See application file for complete search history.

(56) References Cited

U.S. PATENT DOCUMENTS

| | | | | |
|---|---|---|---|---|
| 5,078,224 A | * | 1/1992 | Attinger et al. | 180/68.4 |
| 2008/0308332 A1 | * | 12/2008 | Gonzalez-Salvador | 180/68.4 |
| 2011/0018310 A1 | * | 1/2011 | Tomimatsu | 296/190.01 |

FOREIGN PATENT DOCUMENTS

| | | |
|---|---|---|
| EP | 0 908 375 A1 | 4/1999 |
| EP | 1 604 886 A2 | 12/2005 |
| WO | WO 02/070327 A1 | 9/2002 |

OTHER PUBLICATIONS

European Search Report in Application No. 12305413.2, mailed on Aug. 2, 2012 in 4 pages.

*Primary Examiner* — Joseph D Pape
*Assistant Examiner* — Dana Ivey
(74) *Attorney, Agent, or Firm* — Knobbe, Martens, Olson & Bear, LLP

(57) ABSTRACT

This front-end assembly (4) comprises a front-end module (16), at least one railplate (18A, 18B) adapted to be attached to a rail (14A, 14B) of a motor vehicle chassis, and means for fastening the railplate (18A, 18B) to the front-end module (16), the railplate (18A, 18B) comprising at least one hole for receiving a pin.
The fastening means comprise, for the railplate (18A, 18B), at least one locking pin and at least one fastening element, said locking pin being attached to the front-end module (16) and being adapted to be received by said hole, said fastening element including a fastening part which is mechanically linked to said railplate (18A, 18B) and which is movable relative to the railplate (18A, 18B), said fastening part having at least one aperture for receiving said locking pin, and means for locking the front-end module (16) onto said railplate (18A, 18B), said locking means comprising at least one guiding slide, said guiding slide being contiguous with said aperture and being adapted to lock the locking pin, the locking being performed by a rectilinear movement of the fastening part from a first position in which the aperture is aligned with the hole, to a second position in which the guiding slide is aligned with the hole.

16 Claims, 8 Drawing Sheets

MOTOR VEHICLE FRONT-END ASSEMBLY COMPRISING MEANS FOR LOCKING A FRONT-END MODULE ONTO A RAILPLATE

FIELD OF THE INVENTION

The present invention relates to a motor vehicle front-end assembly of the type comprising a front-end module, at least one railplate adapted to be attached to a rail of a motor vehicle chassis, and means for fastening the railplate to the front-end module, the railplate comprising at least one hole for receiving a pin.

The present invention also relates to a front-end device comprising a front-end assembly of this type.

The present invention also relates to a motor vehicle comprising a front-end device of this type.

BACKGROUND OF THE INVENTION

A front-end assembly of the type described above forms for example a motor vehicle "technical front-end assembly" and enables various vehicle components to be attached under the hood of the vehicle, such as optics, a group of heating, ventilation and air conditioning (HVAC), engine cooling air management, vehicle drag air management or a hood closing lock and others. Due to its structure and the materials used to produce it, such an assembly has the function of providing end customer firm feel and/or high quality characteristics along with absorption of a part of the energy released during an impact against the front of the vehicle and of limiting the intrusion of outside elements in the motor vehicle during this impact.

A front-end assembly of the aforementioned type is known. The front-end module of such a front-end assembly is intended to be attached to a bumper beam of the vehicle. Before this, the front-end module is mounted on at least one rail of the motor vehicle chassis. During this operation, the fascia of the bumper beam is removed because the operator must have an access to tighten the mounting bolts that are located onto the rail. Such an assembly process is time consuming for a manufacturer since both steps of tightening the bolts and then attaching the bumper beam to the front-end module are relatively slow.

Solutions to this problem have been found. One solution is to mount jointly the front-end module with the bumper beam previously installed, onto the rail, and to drill the fascia of the bumper beam. Thanks to this drilling, an operator is then able to reach the mounting bolts from the front of the vehicle, and to fasten the front-end module to the rail with a longitudinal socket drive tool.

However, the operator then has to place unaesthetic cap plugs in the fascia holes so as to cover them up. Furthermore, the operator performs such an operation blindly, i.e. without seeing the holes receiving the mounting bolts in the rail, which complicates the operation significantly and slows the assembly process.

SUMMARY OF THE INVENTION

One object of the invention is to provide a front-end assembly which facilitates the mounting of the front-end module on the rail whilst maintaining accurate geometric vehicle position, without requiring the drilling of the fascia of the bumper beam.

The invention therefore relates to a front-end assembly of the aforementioned type, wherein the fastening means comprise, for the railplate, at least one locking pin and at least one fastening element, said locking pin being attached to the front-end module and being adapted to be received by said hole, said fastening element including a fastening part which is mechanically linked to said railplate and which is movable relative to the railplate, said fastening part having at least one aperture for receiving said locking pin, and means for locking the front-end module onto said railplate, said locking means comprising at least one guiding slide, said guiding slide being contiguous with said aperture and being adapted to lock the locking pin, the locking being performed by a rectilinear movement of the fastening part from a first position in which the aperture is aligned with the hole, to a second position in which the guiding slide is aligned with the hole.

According to other features of the front-end assembly:
the locking means further comprise a tightening organ, said tightening organ being adapted, when actuated, to move the fastening part relative to the railplate from the first position to the second position;
the railplate is fastened to a supporting frame of the front-end module, said supporting frame having a substantially rectangular shape;
at least one railplate comprises two holes, the fastening means comprising, for said railplate, at least two locking pins and two fastening elements, each hole receiving one locking pin, each fastening element having one aperture for receiving one locking pin;
the tightening organ is located perpendicular to each locking pin, the rectilinear movement of each fastening part being effected parallel to the longest direction of the supporting frame;
the tightening organ is located perpendicular to the locking pin, the rectilinear movement of the fastening part being effected parallel to the shortest direction of the supporting frame;
the front-end assembly comprises at least a first railplate and a second railplate, the first railplate being fastened to an upper part of the supporting frame, the second railplate being fastened to a lower part of the supporting frame, the tightening organ of each fastening element being located perpendicular to each locking pin, the rectilinear movement of the fastening part associated with one railplate among the first and second railplates being effected parallel to the longest direction of the supporting frame, the rectilinear movement of the fastening part associated with the other railplate being effected parallel to the shortest direction of the supporting frame;
the guiding slide comprises a limit stop at one of its ends;
the front-end module is equipped with a plurality of fixing means, said means enabling parts of the vehicle to be attached to the front-end module.

The invention also relates to a front-end device comprising a bumper beam, wherein a front-end assembly as described above is attached to said bumper beam.

According to other aspects of the front-end device:
the bumper beam is adapted to be inserted in the front-end assembly via at least one protruding tip, the front-end module comprising at least one hole for receiving said protruding tip, the railplate further comprising means for guiding said protruding tip towards the inside of a rail once the bumper beam is inserted in the front-end assembly;
the guiding means comprise at least one complementary housing, said housing being adapted to cooperate with the protruding tip when the bumper beam is inserted in the front-end assembly, said housing being adapted to be inserted inside the rail;

the protruding tip comprises at least one non-return cotter pin, the complementary housing having a complementary aperture for receiving said non-return cotter pin.

The invention also relates to a motor vehicle comprising a chassis equipped with at least one rail, wherein a front-end device as described above is attached to said rail.

According to another aspect of the invention, the motor vehicle comprises the following feature:

the rail comprises a blocking aperture, said blocking aperture being adapted to receive the non-return cotter pin.

BRIEF DESCRIPTION OF THE DRAWINGS

Other aspects and advantages of the invention will appear upon reading the following description, given by way of example and with reference to the accompanying drawings, in which.

DETAILED DESCRIPTION OF THE PREFERRED EMBODIMENTS

Within this description, the terms "longitudinal", "transverse", "front", "rear", "horizontal" and "vertical" are defined in accordance with the conventional directions of an assembled motor vehicle, i.e. the longitudinal direction corresponds to the length of the vehicle and the transverse direction corresponds to the width of the vehicle.

Figure 1:
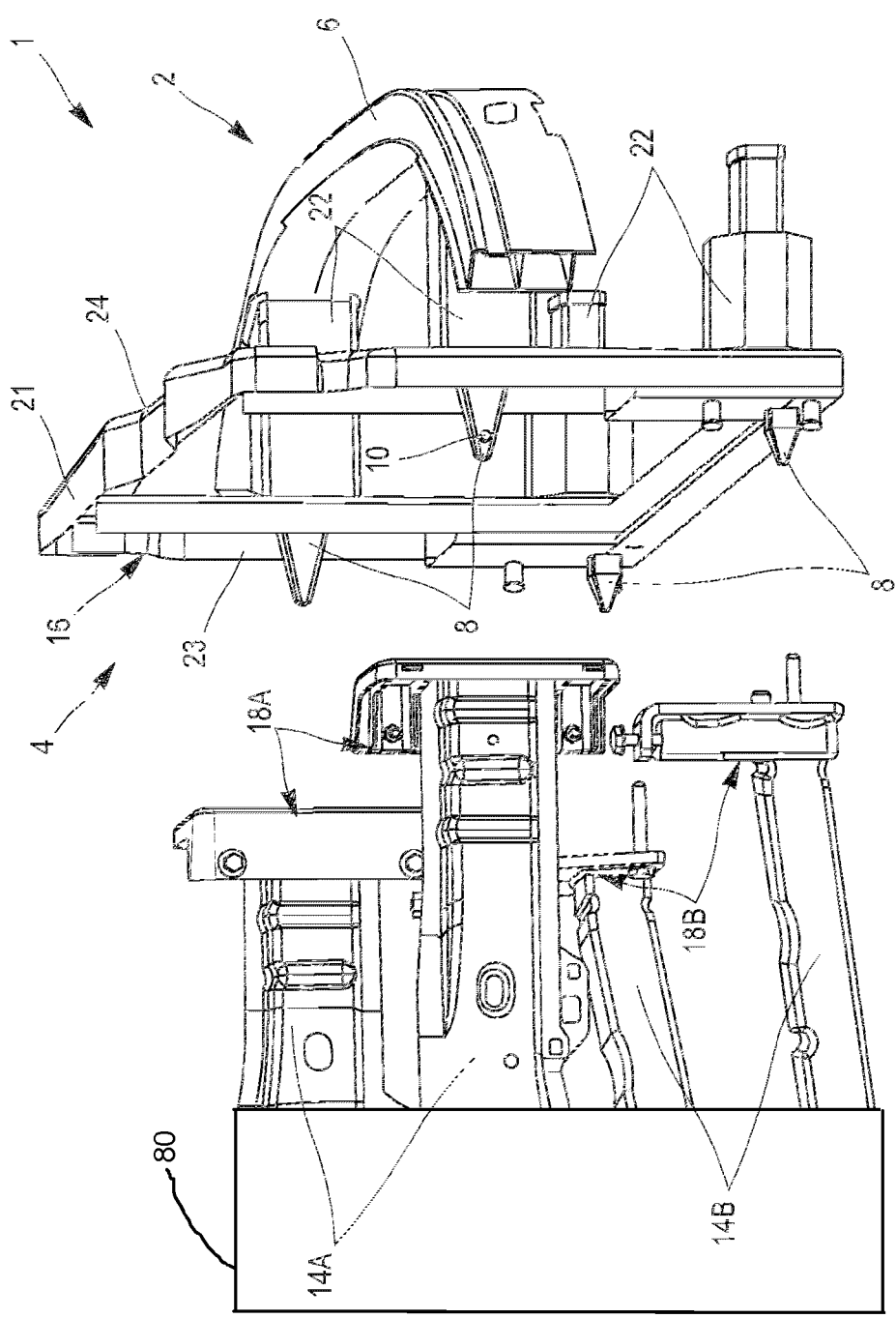
FIG. 1 is a schematic, perspective view of a motor vehicle front-end device comprising a bumper beam and a front-end assembly according to the invention.

With reference to FIG. 1, a motor vehicle front-end device 1 according to the invention is described. The front-end device 1 comprises a bumper beam 2 and a front-end assembly 4 attached to the bumper beam 2.

The bumper beam 2 comprises a transverse beam 6 attached to two longitudinal supports. Each longitudinal support is formed in a single piece with the transverse beam 6 and has two ends. One end of each longitudinal support is a protruding tip 8. In the example shown in FIGS. 1 to 8, each protruding tip 8 has a substantially conical shape and comprises a non-return cotter pin 10. The non-return cotter pin 10 is formed for example by a substantially cylindrical part mounted on a spring, as shown in FIG. 5 for example. The bumper beam 2 is inserted in the front-end assembly 4, with each protruding tip 8 extending through the front-end assembly 4.

The front-end assembly 4 is intended to be attached to the motor vehicle chassis in a conventional manner such as to a rail of the motor vehicle chassis. In the embodiment shown in FIG. 1, the front-end assembly 4 is attached to four longitudinal rails of the chassis 80; more precisely it is attached to two upper rails 14A and two lower rails 14B. The front-end assembly 4 comprises a front-end module 16, two upper railplates 18A and two lower railplates 18B. Each upper railplate 18A, respectively each lower railplate 18B, is adapted to be attached to an upper rail 14A, respectively a lower rail 14B. According to the embodiment shown in FIG. 2, the front-end assembly 4 further comprises four upper fastening elements 19A and two lower fastening elements 19B.

Each rail 14A, 14B comprises a blocking aperture 20 adapted to receive the non-return cotter pin 10 of a protruding tip 8.

The front-end module 16 extends for example under part or all of the available height under the hood of the motor vehicle and basically comprises a supporting frame 21 The front-end module 16 further comprises means 22 for fixing parts of the vehicle.

Figure 2:
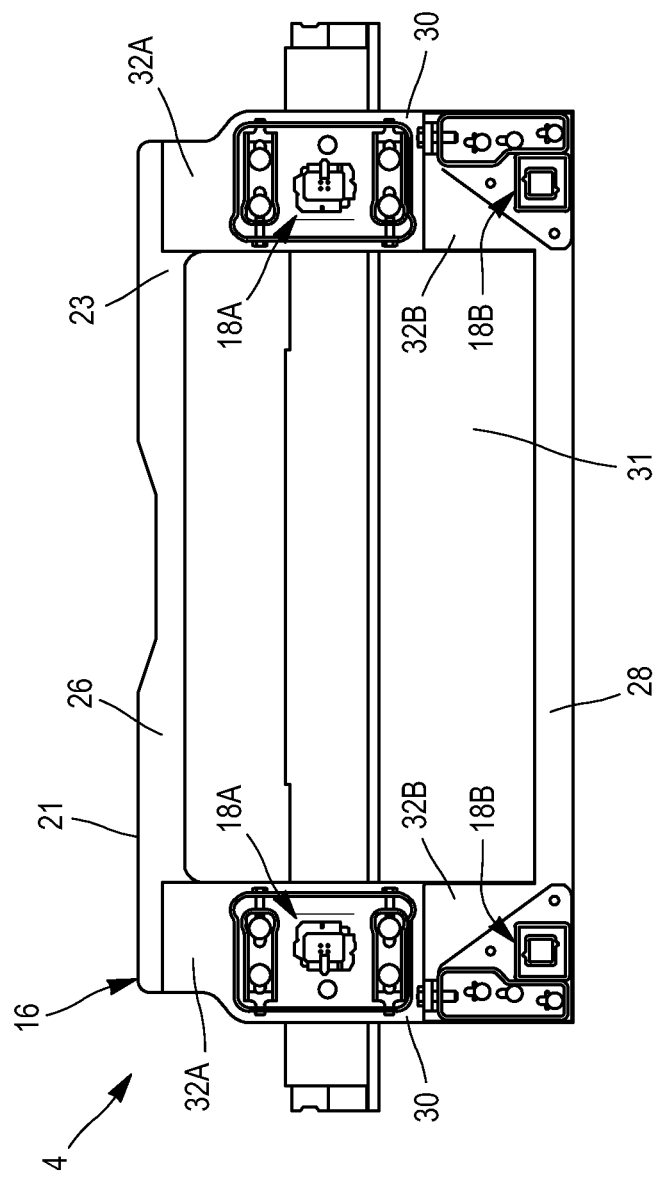
FIG. 2 is a schematic, rear view of the front-end assembly of FIG. 1 comprising a front-end module, four railplates and six fastening elements.

The supporting frame 21 contributes to the rigidity to the motor vehicle chassis. In the embodiment shown, the supporting frame 21 is in the form of a plastics material frame having a substantially rectangular shape. The supporting frame 21 is formed in a single piece and comprises a rear face 23 and a front face 24 extending opposite the rear face 23. As shown in FIG. 2, the rear face 23 comprises an upper beam 26 and a lower beam 28 separated from one another in height and two lateral arms 30 separated from one another in the transverse direction. The upper beam 26 and the lower beam 28 are connected to each other at their transverse ends by the lateral arms 30 such that the beams 26, 28 and the arms 30 form the supporting frame 21 surrounding a central opening 31.

Figure 3:
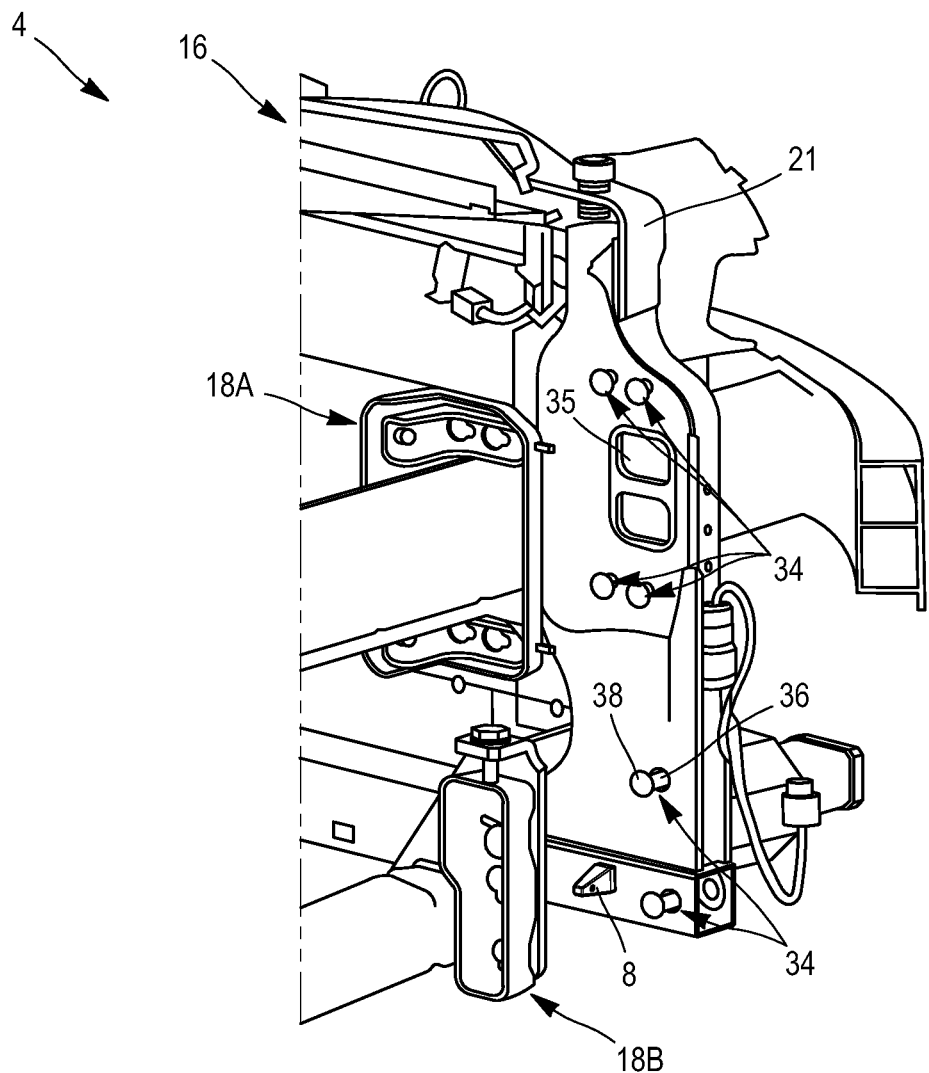
FIG. 3 is a schematic, perspective close view of part of the front-end assembly of FIG. 1.

Each lateral arm 30 is divided into an upper part 32A and a lower part 32B. As shown in FIG. 3, each upper part 32A comprises four locking pins 34 and one rectangular hole 35 adapted to receive a protruding tip 8. Each lower part 32B comprises two locking pins 34 and one protruding tip 8. The locking pins 34 and the protruding tips 8 protrude longitudinally from the rear face 23 of the frame 21 towards the rails 14A, 14B. Each locking pin 34 is attached to the supporting frame 21, and includes a rod 36 and a head 38 that protrudes radially from the rod 36. The rod 36 and the head 38 both have a cylindrical shape, the diameter of the head 38 being larger than that of the rod 36, as shown in FIG. 5 for example.

The fixing means 22 enable parts of the vehicle to be attached to the front-end module 16. They include for example fixation points for the bumper beam 2. They advantageously include fixation points for optics, grills or attachments (not shown) for example. The opening 31 is for example adapted to receive a radiator of the vehicle.

Each upper railplate 18A, respectively each lower railplate 18B, is adapted to be fastened to an upper part 32A, respectively a lower part 32B of the supporting frame 21, and thus makes it possible to attach the front-end module 16 to an upper rail 14A, respectively a lower rail 14B, as described below.

Figure 4:
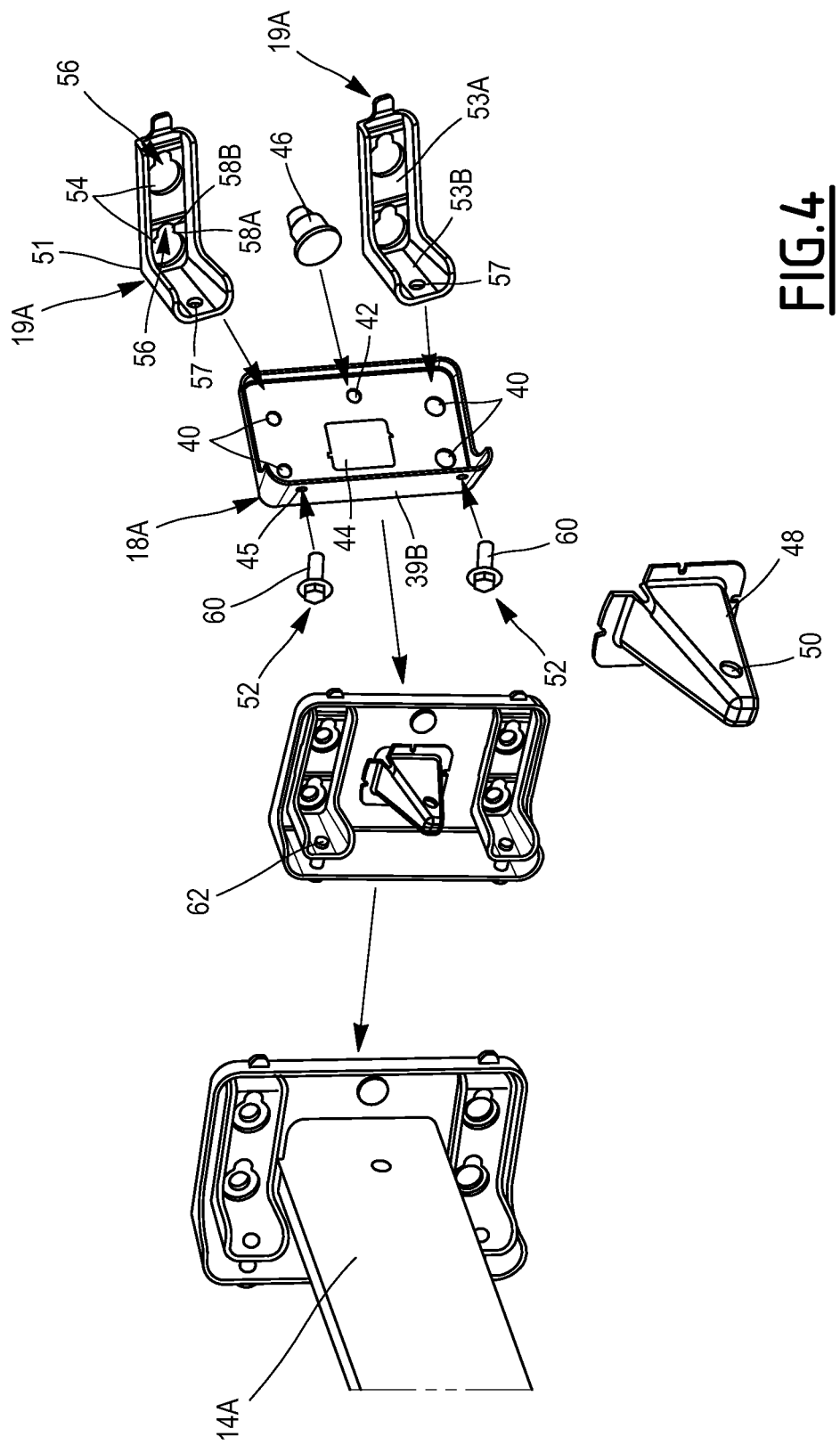
FIG. 4 is a schematic, exploded view of a railplate of FIG. 2 associated with two fastening elements, the railplate comprising a complementary housing.
Figure 5:
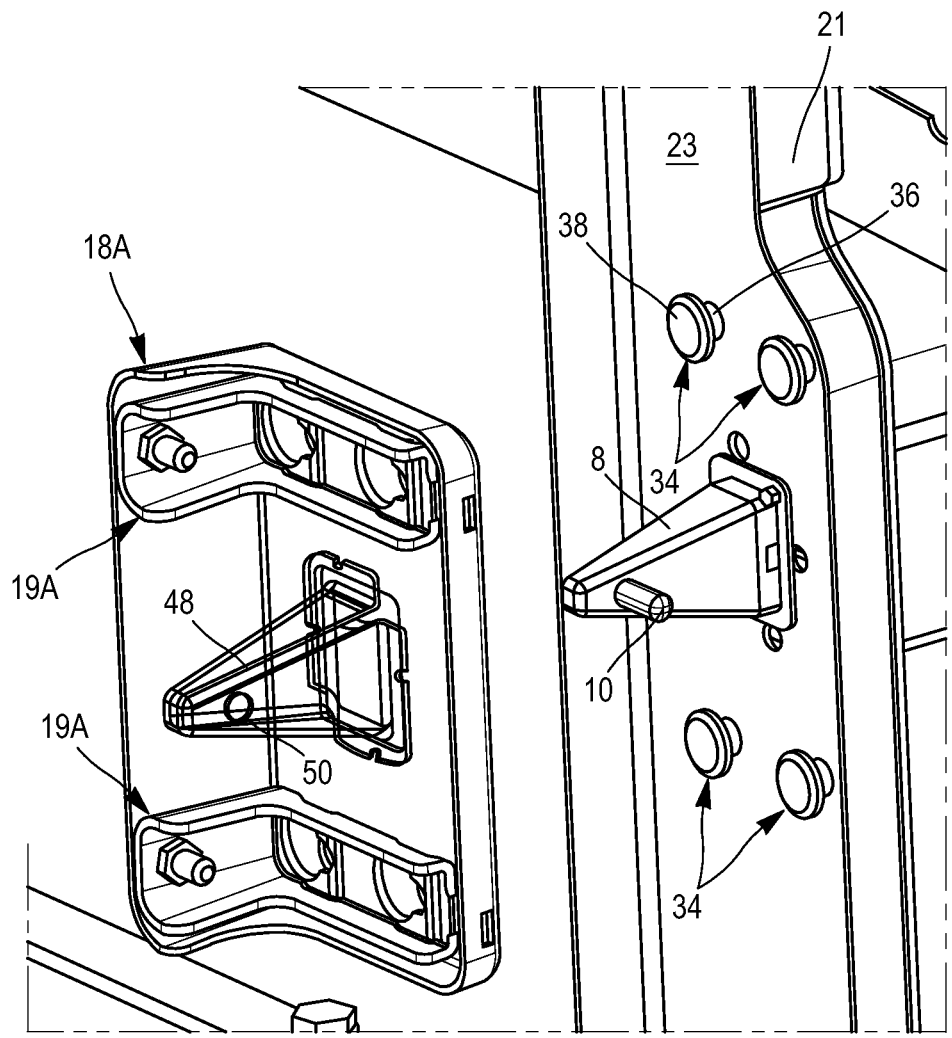
FIG. 5 is a schematic, perspective view of the railplate of FIG. 4 adapted to cooperate with a protruding tip of the bumper beam via its complementary housing.

In the example shown in FIG. 4, each upper railplate 18A is formed by a L-shaped plate and is associated with two upper fastening elements 19A. The L-shaped plate 18A comprises a first rectangular part 39A and a second rectangular part 39B, the second rectangular part 39B extending perpendicularly to the first rectangular part 39A. The first rectangular part 39A extends in a transversal plane while the second rectangular part 39B extends in a longitudinal plane. The first rectangular part 39A comprises four circular holes 40, each circular hole 40 being adapted to receive a locking pin 34. The first rectangular part 39A further comprises a first circular aperture 42 and a rectangular aperture 44. The second rectangular part 39B comprises two second circular apertures 45.

The first circular aperture 42 is adapted to receive a slug 46. The slug 46 is intended to allow positioning of the L-shaped plate 18A against the rear face 23 of the supporting frame 21.

Figure 6:
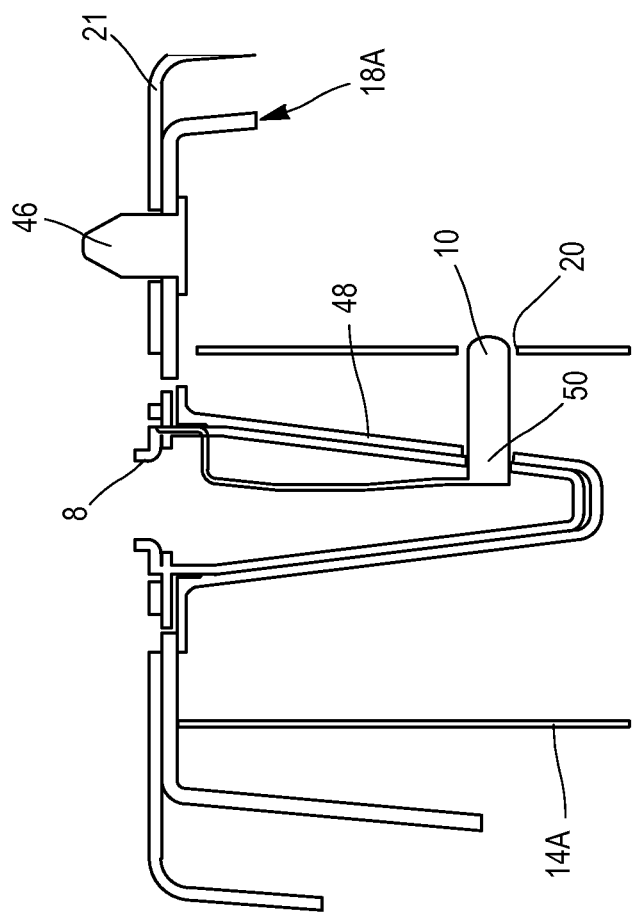
FIG. 6 is a sectional, top view of the protruding tip and the complementary housing of FIG. 5, the complementary housing being inserted inside a rail of the motor vehicle chassis.

The rectangular aperture 44 is adapted to receive a housing 48. The housing 48 is provided with a circular aperture 50. As shown in FIG. 5, the housing 48 has a complementary shape to that of each protruding tip 8, that is to say a substantially conical shape in the embodiment shown. The housing 48 is thus adapted to receive a protruding tip 8, the circular aperture 50 being adapted to receive the non-return cotter pin 10 of said protruding tip 8. Moreover the housing 48 is adapted to be inserted inside an upper rail 14A and to allow guiding of the protruding tip 8 towards the inside of the upper rail 14A, as shown in FIG. 6.

Returning to the example shown in FIG. 4, each upper fastening element 19A comprises a L-shaped plate 51 and a tightening organ 52. The L-shaped plate 51 comprises a first rectangular part 53A and a second rectangular part 53B, the second rectangular part 53B extending perpendicularly to the first rectangular part 53A. The first rectangular part 53A extends in a transversal plane while the second rectangular part 53B extends in a longitudinal plane. The first rectangular part 53A comprises two first circular apertures 54 and two guiding slides 56. The second rectangular part 53B comprises a second circular aperture 57 intended to be aligned with a second circular aperture 45.

Each first circular aperture 54 is adapted to receive a locking pin 34. More precisely, each first circular aperture 54 has a diameter which is larger than that of the head 38 of a locking pin 34 and is thus adapted to receive said head 38 when pushing the frame 21 against the upper railplate 18A. Each guiding slide 56 is formed by an oblong hole, and has a first end 58A which opens into a first circular aperture 54 and a second end 58B in the form of a semi-circle with a diameter slightly greater than or equal to that of the rod 36 of a locking pin 34. The second end 58B thus forms a limit stop of the guiding slide 56. Each guiding slide 56 is contiguous with a first circular aperture 54 and has a width which is larger than or equal to the diameter of the rod 36 of a locking pin 34 but shorter than the diameter of the head 38.

The L-shaped plate 51 is mechanically linked, via the tightening organ 52, to the railplate 18A. The L-shaped plate 51 is adapted to be moved by a rectilinear movement effected in a transversal plane, relative to the railplate 18A and parallel to the direction defined by the upper and lower beams 26, 28 of the frame 21.

The tightening organ 52 comprises for example a screw 60 and a nut 62. The screw 60 is adapted to extend through the second circular aperture 45, the second circular aperture 57 and the nut 62, in this order. The tightening organ 52 is thus located perpendicular to each locking pin 34 when the L-shaped plate 18A is positioned against the rear face 23 of the supporting frame 21. The tightening organ 52 is adapted, when actuated by an operator, to move the L-shaped plate 51 relative to the railplate 18A by a rectilinear pulling movement from a first position to a second position. In the first position each first circular aperture 54 is aligned with a circular hole 40, and the railplate 18A is positioned against the rear face 23, the head 38 of each locking pin 34 extending through a hole 40 and a first circular aperture 54. Besides, in this first position, a protruding tip 8 is inserted in the housing 48, the housing 48 being inserted inside an upper rail 14A. In the second position each guiding slide 56 is aligned with a circular hole 40 and the front-end module 16 is locked onto the railplate 18A, the rod 36 of each locking pin 34 extending along the second end 58B of a guiding slide 56.

Alternatively, each railplate 18A comprises two circular holes 40 and is associated with two upper fastening elements 19A, each upper fastening element 19A including one first circular aperture 54 and one guiding slide 56.

Similarly, each lower railplate 18B is formed by a L-shaped plate and is associated with one lower fastening element 19B, as shown for example in FIG. 2. The L-shaped plate 18B is similar to the L-shaped plate 18A and won't be described in detail hereinafter.

Figure 7:
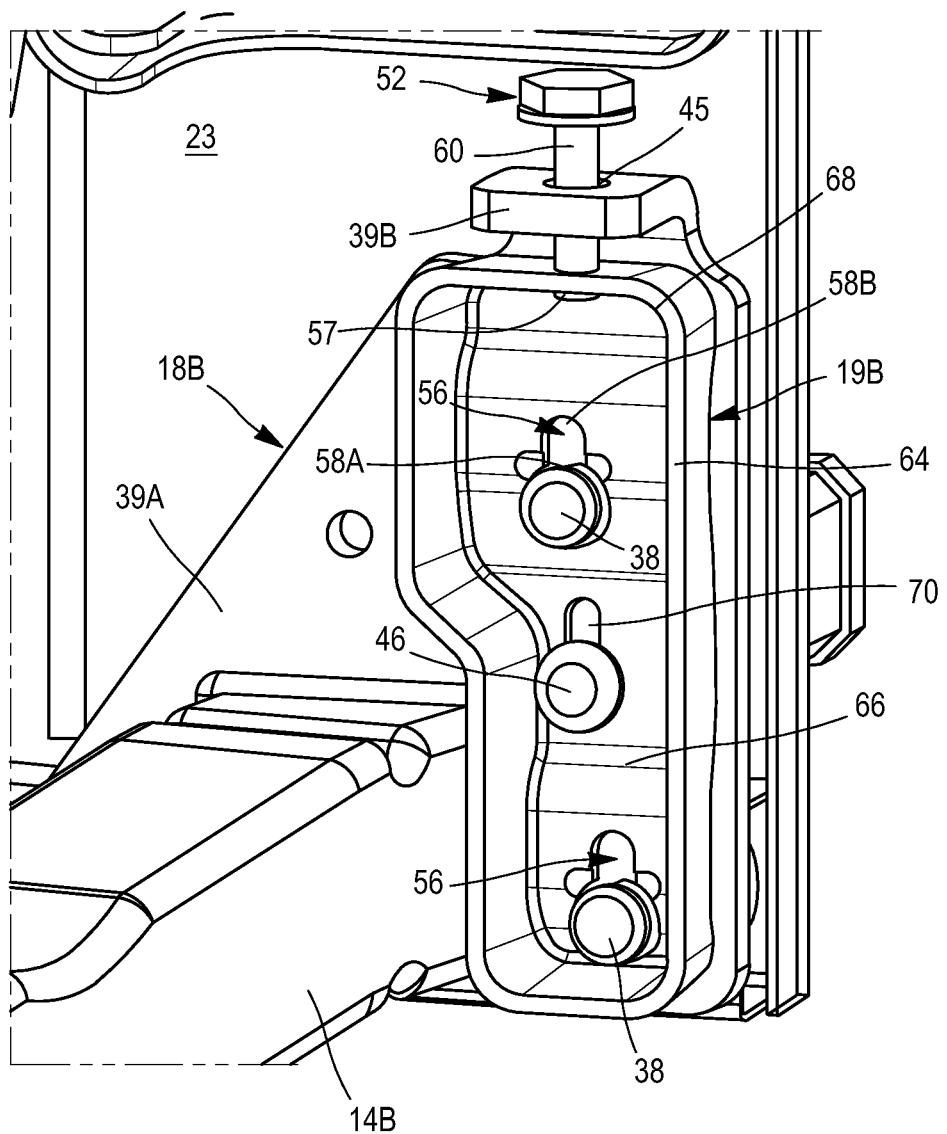
FIG. 7 is a schematic, perspective view of another railplate of FIG. 2 associated with one fastening element, in which the fastening element is in a first position.

As shown in FIG. 7, the L-shaped plate 18B comprises a first rectangular part 39A and a second rectangular part 39B. The first rectangular part 39A comprises two circular holes 40 and a rectangular aperture 44 adapted to receive a housing 48. The second rectangular part 39B comprises one second circular aperture 45. Each lower fastening element 19B comprises a receptacle 64 and a tightening organ 52. The receptacle 64 is provided with a bottom wall 66 and a side wall 68. The bottom wall 66 comprises two first circular apertures 54 and two guiding slides 56. The bottom wall 66 further comprises a positioning slide 70. The positioning slide 70 is formed by an oblong hole and is adapted to receive a slug 46. The side wall 68 comprises a second circular aperture 57.

The receptacle 64 is mechanically linked, via the tightening organ 52, to the railplate 18B. The receptacle 64 is adapted to be moved by a rectilinear movement effected in a transversal plane, relative to the railplate 18B and parallel to the direction defined by the lateral arms 30 of the frame 21.

Figure 8:
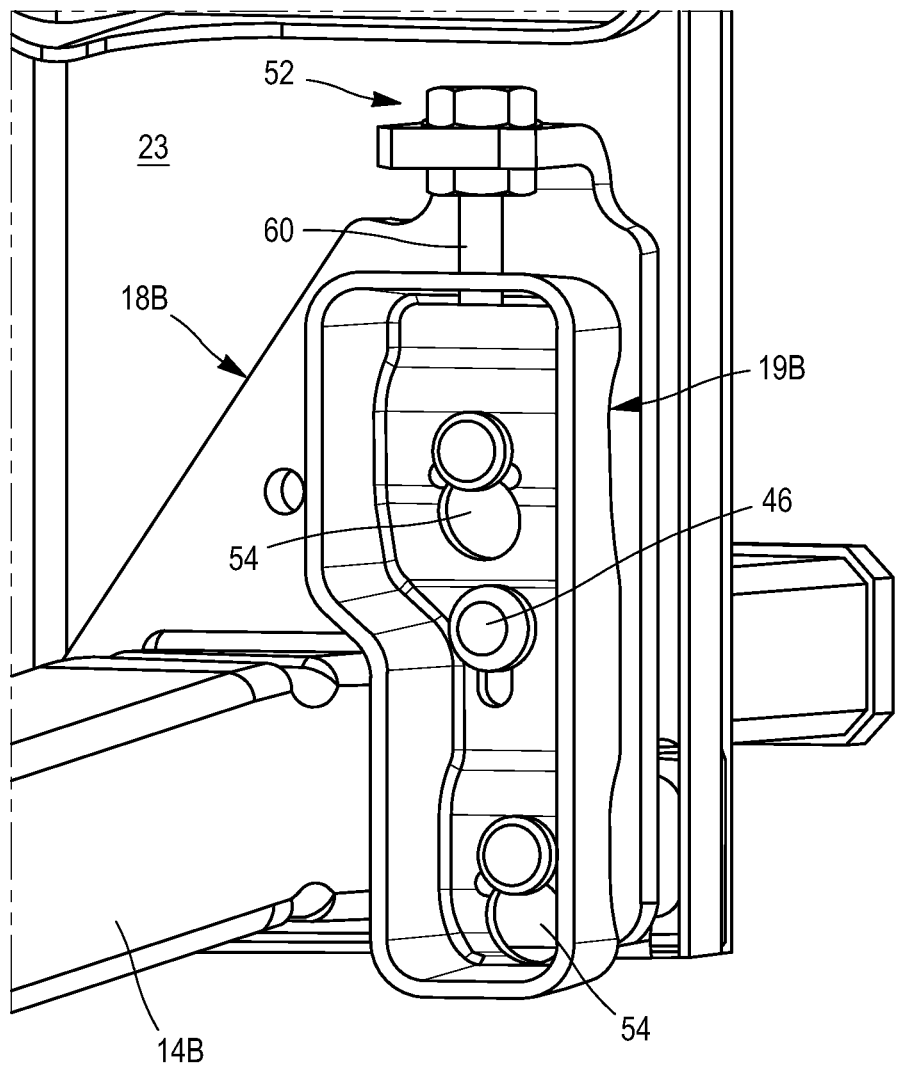
FIG. 8 is a view similar to that of FIG. 7, in which the fastening element is in a second position and the front-end module is locked onto the railplate.

The tightening organ 52 is adapted, when actuated by an operator, i.e. when a torque is applied on it, to move the receptacle 64 relative to the railplate 18B by a rectilinear pushing movement from a first position to a second position. The first position of the receptacle 64 corresponds to the first position of the L-shaped plate 51, and is shown in FIG. 7. In the first position, the railplate 18B is positioned against the rear face 23 of the supporting frame 21. The second position of the receptacle 64 corresponds to the second position of the L-shaped plate 51, and is shown in FIG. 8. In the second position the front-end module 16 is locked onto the railplate 18B.

Alternatively, each railplate 18B comprises one circular hole 40 and is associated with one lower fastening element 19B, said lower fastening element 19B including one first circular aperture 54 and one guiding slide 56.

The fastening of the front-end-module 16 to the rails 14A, 14B via the railplates 18A, 18B will now be described.

Initially, the bumper beam 2 is inserted in the front-end assembly 4 and attached to it, with the four protruding tips 8 extending from the rear face 23 of the supporting frame 21. In addition, each upper railplate 18A, respectively each lower railplate 18B, is attached to an upper rail 14A, respectively a lower rail 14B. An operator then brings the rear face 23 of the supporting frame 21 against the front faces of the railplates 18A, 18B. He then engages the locking pins 34 in the associated circular holes 40 and the first circular apertures 54, being guided in this operation by the insertion of each protruding tip 8 in a housing 48, inside a rail 14A, 14B. The operator further inserts the front-end device 1 in the rails 14A, 14B until each non-return cotter pin 10 is engaged in a blocking aperture 20 of a rail 14A, 14B. The L-shaped plates 51 of the upper fastening elements 19A and the receptacles 64 of the lower fastening elements 19B are then in their first position, and the front-end device 1 is held in place onto the rails 14A, 14B. In this first position, each upper railplate 18A, respectively each lower railplate 18B, extends transversally between the end of a rail 14A, respectively 14B, and the rear face 23 of the frame 21. The operator releases the front-end device 1 and applies a torque on each tightening organ 52 so as to tighten it. By a simple rectilinear movement of each L-shaped plate 51, respectively each receptacle 64 relative to the associated railplate 18A, respectively 18B, the operator makes each rod 36 of a locking pin 34 cooperate with an associated guiding slide 56. Each guiding slide 56 moves rectilinearly around a rod 36 until the rod 36 reaches the limit stop 58B of the guiding slide 56, namely its second end 58B. The L-shaped plates 51 and the receptacles 64 are then in their second position. The locking pins 34 are locked, thereby causing the locking of the frame 21 onto the railplates 18A, 18B and therefore the locking of the front-end module 16 onto the railplates 18A, 18B.

The front-end assembly 4 thus makes it possible to facilitate the mounting of the front-end module 16 on the rails 14A, 14B whilst maintaining accurate geometric vehicle position, without requiring the drilling of the fascia of the bumper beam 12.

In addition, this "semi blind" assembly process is very simple because the locking of the front-end assembly is effected by a simple translation of the fastening element, once the front-end assembly is held in place onto the rails. Thus the operator does not need to hold the front-end assembly, neither to pass a tool through the fascia of the bumper beam, to lock the front-end module onto the rails. The time required for this assembly process and the production costs associated are therefore reduced. The description has been made with reference to a front-end assembly. However, it is understood that the invention also applies to any part to be fastened to a vehicle rail, or to different body parts to be fastened together, for example.

The invention claimed is:

1. A motor vehicle front-end assembly comprising a front-end module, at least one railplate adapted to be attached to a rail of a motor vehicle chassis, the rail extending along a longitudinal axis of the motor vehicle and the at least one railplate extending against an end of the rail in a plan perpendicular to the longitudinal direction between the front-end assembly and the rail, and a fastener for fastening the at least one railplate to the front-end module, the at least one railplate comprising at least one hole configured to receive a pin, wherein the fastener comprises at least one locking pin and at least one fastening element, said at least one locking pin being attached to the front-end module and being adapted to be received by said at least one hole, said at least one locking pin extending along the longitudinal direction, said at least one fastening element including a fastening part which is mechanically linked to said at least one railplate and which is movable relative to the at least one railplate, said fastening part having at least one aperture configured to receive said at least one locking pin, and a locking mechanism configured to lock the front-end module onto said at least one railplate, said locking mechanism comprising at least one guiding slide, said at least one guiding slide being contiguous with said at least one aperture and being adapted to lock the at least one locking pin, the locking being performed by a rectilinear movement of the fastening part from a first position in which the aperture is aligned with the at least one hole, to a second position in which the at least one guiding slide is aligned with the at least one hole.

2. A front-end assembly according to claim 1, wherein the locking mechanism further comprises a tightening organ, said tightening organ being configured to move the fastening part relative to the at least one railplate from the first position to the second position.

3. A front-end assembly according to claim 2, wherein the at least one railplate is fastened to a supporting frame of the front-end module, said supporting frame having a substantially rectangular shape.

4. A front-end assembly according to claim 3, wherein at least one railplate comprises two holes, the fastener comprising at least two locking pins and two fastening elements, each hole receiving one locking pin, each fastening element having one aperture for receiving one locking pin.

5. A front-end assembly according to claim 4, wherein the tightening organ is located perpendicular to each locking pin, the rectilinear movement of each fastening part being effected parallel to the longest direction of the supporting frame.

6. A front-end assembly according to claim 3, wherein the tightening organ is located perpendicular to the locking pin, the rectilinear movement of the fastening part being effected parallel to the shortest direction of the supporting frame.

7. A front-end assembly according to claim 3, comprising at least a first railplate and a second railplate, the first railplate being fastened to an upper part of the supporting frame, the second railplate being fastened to a lower part of the supporting frame, a tightening organ of each fastening element being located perpendicular to each locking pin, the rectilinear movement of the fastening part associated with one of the first and second railplates being effected parallel to the longest direction of the supporting frame, the rectilinear movement of the fastening part associated with the other of the first and second railplates being effected parallel to the shortest direction of the supporting frame.

8. A front-end assembly according to claim 1, wherein the at least one guiding slide comprises a limit stop at one of its ends.

9. A front-end assembly according to claim 1, wherein the front-end module is equipped with a plurality of attachments, said attachments enabling parts of the vehicle to be attached to the front-end module.

10. A front-end device comprising a bumper beam and a front-end assembly, said bumper beam being attached to said front-end assembly, wherein said front-end assembly is in accordance with claim 9.

11. A front-end device according to claim 10, wherein the bumper beam is adapted to be inserted in the front-end assembly via at least one protruding tip, the front-end module comprising at least one hole configured to receive said at least one protruding tip, the at least one railplate further comprising a guide configured to guide said at least one protruding tip towards the inside of the rail of a motor vehicle chassis, once the bumper beam is inserted in the front-end assembly.

12. A front-end device according to claim 11, wherein the guide comprise at least one complementary housing, said housing being adapted to cooperate with the at least one protruding tip when the bumper beam is inserted in the front-end assembly, said housing being adapted to be inserted inside the rail.

13. A front-end device according to claim 12, wherein the at least one protruding tip comprises at least one non-return cotter pin, the complementary housing having a complementary aperture for receiving said non-return cotter pin.

14. A motor vehicle comprising a chassis equipped with at least one rail, wherein a front-end device according to claim 10 is attached to said at least one rail.

15. A motor vehicle comprising a chassis equipped with at least one rail, wherein a front-end device according to claim 13 is attached to said at least one rail.

16. A motor vehicle according to claim 15, wherein the at least one rail comprises a blocking aperture, said blocking aperture being adapted to receive the non-return cotter pin.

\* \* \* \* \*